US011014852B2

(12) United States Patent
Kriven et al.

(10) Patent No.: US 11,014,852 B2
(45) Date of Patent: May 25, 2021

(54) FLOWABLE SLAG-FLY ASH BINDERS FOR CONSTRUCTION OR REPAIR

(71) Applicants: Board of Trustees of the University of Illinois, Urbana, IL (US); United States of America as Represented by The Secretary of The Army, Alexandria, VA (US)

(72) Inventors: Waltraud M. Kriven, Champaign, IL (US); Kaushik Sankar, Champaign, IL (US); Ghassan K. Al-Chaar, Champaign, IL (US)

(73) Assignees: THE BOARD OF TRUSTEES OF THE UNIVERSITY OF ILLINOIS, Urbana, IL (US); UNITED STATES OF AMERICA AS REPRESENTED BY THE SECRETARY OF THE ARMY, Alexandria, VA (US)

( * ) Notice: Subject to any disclaimer, the term of this patent is extended or adjusted under 35 U.S.C. 154(b) by 15 days.

(21) Appl. No.: 16/255,131

(22) Filed: Jan. 23, 2019

(65) Prior Publication Data
US 2019/0225544 A1 Jul. 25, 2019

Related U.S. Application Data

(60) Provisional application No. 62/620,834, filed on Jan. 23, 2018.

(51) Int. Cl.
*C04B 40/00* (2006.01)
*C04B 28/26* (2006.01)
(Continued)

(52) U.S. Cl.
CPC .............. *C04B 28/26* (2013.01); *C04B 18/02* (2013.01); *C04B 40/0039* (2013.01);
(Continued)

(58) Field of Classification Search
None
See application file for complete search history.

(56) References Cited

U.S. PATENT DOCUMENTS 4,334,798 A * 6/1982 Milne ..................... E01C 7/147
404/75
8,202,362 B2 6/2012 Davidovits et al.
(Continued)

FOREIGN PATENT DOCUMENTS

| GB | 191223879 A | * | 7/1913 | .............. E01C 7/12 |
| GB | 267372 A | * | 3/1927 | .............. E01C 7/12 |
| SU | 1008182 A | | 3/1983 | |

OTHER PUBLICATIONS

Bernal, Susan A., et al. "Gel nanostructure in alkali-activated binders based on slag and fly ash, and effects of accelerated carbonation," *Cement and Concrete Research*, 53 (2013) pp. 127-144.

(Continued)

*Primary Examiner* — Jose I Hernandez-Kenney
(74) *Attorney, Agent, or Firm* — Brinks Gilson & Lione (57) ABSTRACT

A method of using a flowable binder for construction or repair comprises providing a binder mixture including an alkali metal silicate, fly ash, slag, and added water, where a total water-to-solids mass ratio of the binder mixture is in a range from about 0.2 to 0.5. The binder mixture is mixed together with inert particles to form a flowable mortar. The flowable mortar is distributed over a bed of coarse aggregate, and the mortar seeps into interstices of the coarse aggregate. Upon curing, a composite comprising reinforcement material embedded in a cured binder is formed.

6 Claims, 4 Drawing Sheets

(51) Int. Cl.
    *C04B 18/02*       (2006.01)
    *C04B 111/72*     (2006.01)
    *E01C 7/12*        (2006.01)
    *E01C 7/14*        (2006.01)

(52) U.S. Cl.
    CPC ............ *C04B 2111/72* (2013.01); *E01C 7/12* (2013.01); *E01C 7/147* (2013.01)

(56) References Cited

U.S. PATENT DOCUMENTS

2016/0304402 A1    10/2016  Kriven et al.
2017/0073269 A1*   3/2017  Camali .................... B05D 1/02

OTHER PUBLICATIONS

Davidovits, J., et al., "The European Research Project GEOASH: Geopolymer Cement Based on European Coal Fly Ashes," *Technical Paper #22, Geopolymer Institute Library*, www.geopolymer.org (2014) pp. 1-11.

Lloyd, Redmond R., et al. "Microscopy and microanalysis of inorganic polymer cements. 2: the gel binder," *J. Mater. Sci.*, 44 (2009), pp. 620-631.

Chithiraputhiran, Sundararaman et al., "Isothermal reaction kinetics and temperature dependence of alkali activation of slag, fly ash and their blends," *Construction and Building Materials*, 45 (2013) pp. 233-212.

Puligilla, Sravanthi, et al., "Co-existence of aluminosilicate and calcium silicate gel characterized through selective dissolution and FTIR spectral subtraction," *Cement and Concrete Research*, 70 (2015) pp. 39-49.

* cited by examiner

FIG. 5

FLOWABLE SLAG-FLY ASH BINDERS FOR CONSTRUCTION OR REPAIR

RELATED APPLICATION

The present patent document claims the benefit of priority under 35 U.S.C. § 119(e) to U.S. Provisional Patent Application No. 62/620,834, filed on Jan. 23, 2018, which is hereby incorporated by reference in its entirety.

FEDERALLY SPONSORED RESEARCH OR DEVELOPMENT

This invention was made with government support under grant numbers 461088 and P2 457492 awarded by the U.S. Army. The government has certain rights in the invention.

TECHNICAL FIELD

The present disclosure is related generally to binder compositions developed as alternatives to ordinary Portland cement, and more specifically to flowable binder compositions.

BACKGROUND

Concrete is the most widely used construction material in the world. Generally, Portland cement is used as the binder in concrete and it is responsible for most of the properties in concrete. The production of Portland cement involves grinding and calcination of raw materials such as limestone and clay. The ubiquitous use of Portland cement combined with its energy intensive processing techniques releases a significant amount of carbon dioxide into the atmosphere. It has been estimated that a total of ~0.87 tons of carbon dioxide are generated for every ton of ordinary Portland cement (OPC) produced. Efforts to reduce $CO_2$ emissions include improving the energy efficiency of kilns, carbon capture and storage, clinker substitution, and alternative binder development. Thus, there is a need for a more environmentally-friendly, alternative binder, such as those fabricated from inexpensive industrial byproducts like slag and fly ash.

Slag is the residue obtained from the smelting of iron in a blast furnace. Slag becomes useful for geopolymeric reactions when quenched from the melt, resulting in an amorphous, aluminosilicate product that is reactive. Slag can be crushed into a fine, angular powder to increase its reactive specific surface area.

Fly ash is a by-product of coal-burning power plants. Pulverized coal ignites when it is burned in air inside a furnace where temperatures exceed 1200° C. The molten mineral residue chiefly containing aluminosilicates and iron oxides solidifies into hollow, spherical, amorphous cenospheres. Fly ash also contains crystalline phases such as mullite, magnetite, and quartz, which form due to the phase transformations (or lack thereof) of the raw materials at high temperatures. The chemical composition of fly ash is similar to those of some natural aluminosilicates. The reactivity of fly ash depends on the composition and proportion of the glassy phases present, which are dependent on the operating temperature of the coal burning boiler. Hence, fly ashes have been used in making special cements and immobilization of toxic heavy metals.

BRIEF SUMMARY

A flowable binder for construction or repair comprises a binder mixture including an alkali metal silicate, fly ash at a concentration from about 30 wt. % to about 60 wt. %, slag at a concentration from about 9 wt. % to about 33 wt. %, and added water. A total water-to-solids mass ratio of the binder mixture is in a range from about 0.2 to 0.5.

A method of using a flowable binder for construction or repair comprises providing a binder mixture including an alkali metal silicate, fly ash, slag, and added water, where a total water-to-solids mass ratio of the binder mixture is in a range from about 0.2 to 0.5. The binder mixture is mixed together with inert particles to form a flowable mortar. The flowable mortar is distributed over a bed of coarse aggregate, such that the mortar seeps into interstices of the coarse aggregate. Upon curing, a composite (or concrete) comprising reinforcement material embedded in a cured binder is formed.

A composite for construction or repair comprises: a cured binder that includes C-N-A-S-H gel at a concentration from about 39 wt. % to about 64 wt. % and unreacted fly ash; and reinforcement material embedded in the cured binder. In some embodiments, the cured binder may further include unreacted slag.

DETAILED DESCRIPTION

A flowable binder made from inexpensive industrial byproducts has been developed for use in construction or repair. The flowable binder may be described as an alkali silicate-activated slag-fly ash binder that can be used to form a "self-compacting" concrete. Because the industrial byproducts (slag and fly ash) used as raw materials do not require pretreatment prior to usage, the flowable binder is a viable alternative to ordinary Portland cement. Processing of the flowable binder can be carried out at the construction or repair site using readily available, high shear mixers currently used for Portland cement systems. In addition, the flowable binder exhibits excellent compressive and flexural strength upon curing, as well as reasonable set times. The cured binder may include crystalline and amorphous phases in which geopolymers may be present. By properly sourcing the industrial byproducts that serve as aluminosilicate sources, use of the flowable binder instead of ordinary Portland cement can lead to significant reductions in carbon emissions.

The flowable binder comprises a binder mixture including suitable amounts of slag and fly ash, along with an alkali metal silicate and added water. More specifically, the binder mixture includes slag at a concentration from about 9 wt. % to about 33 wt. %, fly ash at a concentration from about 30 wt. % to about 60 wt. %, an alkali metal silicate, and added water. For the desired flowability, a total water-to-solids mass ratio of the binder mixture may be in a range from about 0.2 to about 0.5. The slag may comprise blast furnace slag, such as Grade 100 or Grade 120 blast furnace slag, and the fly ash may comprise Class F fly ash. The number following "Grade" in the slag nomenclature may be referred to as the slag activity index, and it indicates the compressive strength obtained if a portion of Portland cement is substituted with slag, e.g., 100=100% (same strength as Portland cement). Preferably, the concentration of the slag in the binder mixture is from about 16 wt. % to about 33 wt. %, and the concentration of the fly ash may be from about 32 wt. % to about 49 wt. %. The alkali metal silicate may be sodium silicate or another silicate comprising an alkali metal (e.g., Na, K, Rb, Cs), such as potassium silicate.

The binder mixture may have a slag-to-fly ash ratio (or "slag/fly ash ratio") of at least about 0.18 and typically no greater than about 1. Preferably, the slag-to-fly ash ratio is at least about 0.3, at least about 0.5, or at least about 0.7. At higher slag/fly ash ratios, the binder mixtures are found to exhibit higher compressive and flexural strengths upon curing, faster strength development, and reduced setting (curing) times. Accordingly, the binder mixtures with the highest slag/fly ash ratios may be used for rapid repair of roadways due to their rapid strength development and setting time. All of the binder mixtures may be used as a cement for construction. Although the binders cure successfully under ambient temperatures (e.g., 20-25° C.), it should be noted that an increased curing temperature may be used to accelerate curing and strength development.

In one example, the concentration of the slag is at least about 9.75 wt. %, and the concentration of the fly ash is no greater than about 55.25 wt. %. In another example, the concentration of the slag is at least about 13 wt. %, and the concentration of the fly ash is no greater than about 52 wt. %. Preferably, the concentration of the slag is at least about about 16 wt. %, and the concentration of the fly ash is no greater than about 49 wt. %. In another preferred example, the concentration of the slag is at least about 32.5 wt. %, and the concentration of the fly ash is no greater than about 32.5 wt. %.

The total water-to-solids mass ratio referred to above considers both externally added water (the "added water") and any water that might be present with the alkali metal silicate, e.g., in an aqueous solution comprising the alkali metal silicate. The total water-to-solids mass ratio is typically at least about 0.20 or at least about 0.25, and may be as high as about 0.50, as high as about 0.45, or as high as about 0.41. If the alkali metal silicate is present in an aqueous solution, then less added water may be used. If the alkali metal silicate is a solid-phase formulation, then more added water may be used. For example, an aqueous solution comprising the alkali metal silicate may be present at a concentration of about 25 wt. %, and the added water may be present at a concentration of about 10 wt. %. On the other hand, a solid-phase formulation comprising the alkali metal silicate may be present at a concentration of about 10 wt. %, and the added water may be present at a concentration of about 25 wt. %. Generally speaking, the concentration of the added water in the binder mixture may be in a range from about 5 wt. % to about 30 wt. %, where amounts of about 5-15 wt. % are more typical with aqueous solutions of alkali metal silicates, and amounts of 20-30 wt. % are more typical with solid-phase formulations comprising the alkali metal silicate. Exemplary solid-phase formulations of the alkali metal silicate may include anhydrous solid sodium silicate, solid sodium silicate pentahydrate, and/or sodium silicate nonahydrate.

To prepare a flowable binder as described in this disclosure, the alkali metal silicate, the fly ash, and optionally the added water may be mixed together to form a premix, and the premix and the slag may then be mixed together to form the binder mixture. Because the slag promotes curing of the binder mixture, it is typically added after the alkali metal silicate and the fly ash. In some cases, the added water may be incorporated with (or after) the slag, instead of into the premix. As indicated above, to ensure the desired flowability, a total water-to-solids mass ratio of the binder mixture may be in a range from about 0.2 to about 0.5. The binder mixture may have a pH in a range from about 13 to about 14, such as at least about 13.5, where the pH is measured immediately after mixing.

Four exemplary binder mixtures are fabricated and evaluated, as summarized in Table 1 below. The total amount of slag and fly ash is kept constant and the slag/fly ash ratio is varied for each of the binder mixtures. The combined amount of slag and fly ash is held constant at 65 wt. % of the binder mixture. The slag/fly ash ratio is varied from 0 to 1. Increasing the slag/fly ash ratio beyond 1 may result in a flash-setting binder mixture that hardens within about 30 minutes at ambient temperatures (e.g., at about 22° C.). It should be noted that the terms "cure" (or "curing/cured") and "set" (or "setting") may be used interchangeably throughout this disclosure to refer to the hardening of the binder mixture. Also, it is preferred that set time be measured using a needle penetration test carried out according to the ASTM C403 standard.

In these examples, an aqueous solution comprising sodium silicate ("a sodium silicate solution") is employed. The sodium silicate solution has a molar ratio $SiO_2:Na_2O$ in a range from about 1.6 to about 1.7. Generally speaking, the molar ratio $SiO_2:M_2O$ of the alkali metal silicate, where M represents an alkali metal, may be in a range from about 1.0 to about 1.8, with values of 1.6 to about 1.7 being typical. In the exemplary binder mixtures described here, the amount of the sodium silicate solution is held constant at 25 wt. %. Previous experiments indicate that an amount of sodium silicate solution beyond 25 wt. % may lead to a layer of deposits being formed on the cured (hardened) binder, and an amount of sodium silicate solution below 25 wt. % may lead to a reduction in the strength of the cured binder. In these examples, added water is fixed at 10 wt. %; thus, the total water-to-solids mass ratio is between 0.2 and 0.3 (more specifically, 0.26) for all binder mixtures.

TABLE 1

| Binder Mixture Compositions | | | | |
| --- | --- | --- | --- | --- |
| Mix ID | Binder mix (wt %) | | | |
| and slag/fly ash ratio | Slag | Class F fly ash | Na silicate | DI water |
| 0 | 0 | 65 | 25 | 10 |
| 0.18 | 9.75 | 55.25 | 25 | 10 |
| 0.25 | 13 | 52 | 25 | 10 |
| 0.33 | 16.25 | 48.75 | 25 | 10 |
| 1.00 | 32.5 | 32.5 | 25 | 10 |

The Class F fly ash employed for the binder mixture may include the following oxides in the following weight percent ranges: $SiO_2$ at a concentration of about 60-65 wt. %, or about 62-64 wt. %; $Al_2O_3$ at a concentration of about 20-30 wt %, or about 24-26 wt. %; $Fe_2O_3$ at a concentration of about 0-6 wt. %, or about 4-6 wt. %; $K_2O$ at a concentration of about 0-5 wt. %, or about 1-3 wt. %; MgO at a concentration from about 0-5 wt. %, or about 0.5-1.5 wt. %; CaO at a concentration from about 0-5 wt. %, or about 0.5-1.5 wt.

%; and additional oxides (e.g., $Na_2O$, $SO_3$, $TiO_2$, MnO, SrO) in smaller amounts (<1 wt. %). The Class F fly ash may include crystalline and amorphous phases, where the crystalline phases include quartz and mullite.

As indicated above, the slag employed for the binder mixture may be blast furnace slag, such as Grade 100 slag or Grade 120 slag. The slag is preferably amorphous (non-crystalline), as crystalline slag can be fairly unreactive. The Grade 100 slag may include the following oxides in the following weight percentage ranges: $SiO_2$ at a concentration of about 40-45 wt %, or about 42-44 wt. %; CaO at a concentration from about 30-35 wt. %, or about 32-34 wt. %; MgO at a concentration from about 10-15 wt. %, or about 11-13 wt %; $Al_2O_3$ at a concentration of about 9-18 wt. %, or about 9-11 wt. %; $SO_3$ at a concentration of about 0-4 wt. %, or about 2-4 wt. %, and additional oxides (e.g., $K_2O$, $TiO_2$, MnO, $Fe_2O_3$, SrO) in smaller amounts (<1 wt. %). It is noted that the above-mentioned CaO is not free lime, and hence does not cause flash set. The CaO present in fly ash may be free lime, which can cause flash set. The Grade 120 slag may include the following oxides in the following weight percentage ranges: CaO at a concentration from about 38-40 wt. %; $SiO_2$ at a concentration of about 36-38 wt. %; MgO at a concentration from about 10-12 wt. %; $Al_2O_3$ at a concentration of about 10-12 wt. %; $SO_3$ at a concentration of about 1-3 wt. %; additional oxides in smaller amounts (<1 wt. %). While both grades of slags may have the same or a similar composition range, this is not required. The slag activity index is based purely on compressive strength, as discussed above. Grade 100 slag has been found to have a slightly coarser particle size distribution than Grade 120 slag.

A method of using the flowable binder for construction or repair is now described. The method includes a first step of providing the binder mixture, which may entail preparing the binder mixture as described above. In other words, the alkali metal silicate, the fly ash and optionally the added water may be mixed together to form a premix, and the premix and the slag (and the added water if not already incorporated into the premix) may be mixed together to form the binder mixture. The added water is important, but it may optionally be added earlier or later in the process. Providing the binder mixture may alternatively entail providing a previously-prepared premix and then, at a later time (e.g., at the construction or repair site), mixing the previously-prepared premix with the slag and in some cases the added water. As indicated above, curing of the binder mixture is accelerated upon addition of the slag.

After providing and/or preparing the binder mixture, inert particles (e.g., grains of sand) are typically mixed into the binder mixture to form a flowable mortar that may be distributed or poured over a bed of coarse aggregate (e.g., gravel, rocks) to form a concrete structure. The inert particles are substantially non-reactive with components of the binder mixture. Advantageously, the flowable mortar is able to seep into voids or interstices of the coarse aggregate (e.g., to a depth of several inches), in contrast to conventional cements that require mixing with the coarse aggregate prior to pouring into a formwork. Preferably, as the flowable mortar cures to a full-strength composite, the amount of water is held constant. This may be achieved by covering the flowable mortar (e.g., with wet fabric, such as wet burlap) or otherwise controlling the humidity after the flowable mortar is distributed over the coarse aggregate. After curing or setting for a suitable time duration, a composite comprising reinforcement material embedded in a cured binder is formed, where the reinforcement material includes the inert particles and the coarse aggregate. The composite, or concrete, may form all or part of a pavement, curb, driveway, foundation, or other repaired or newly fabricated structure.

Figure 1:
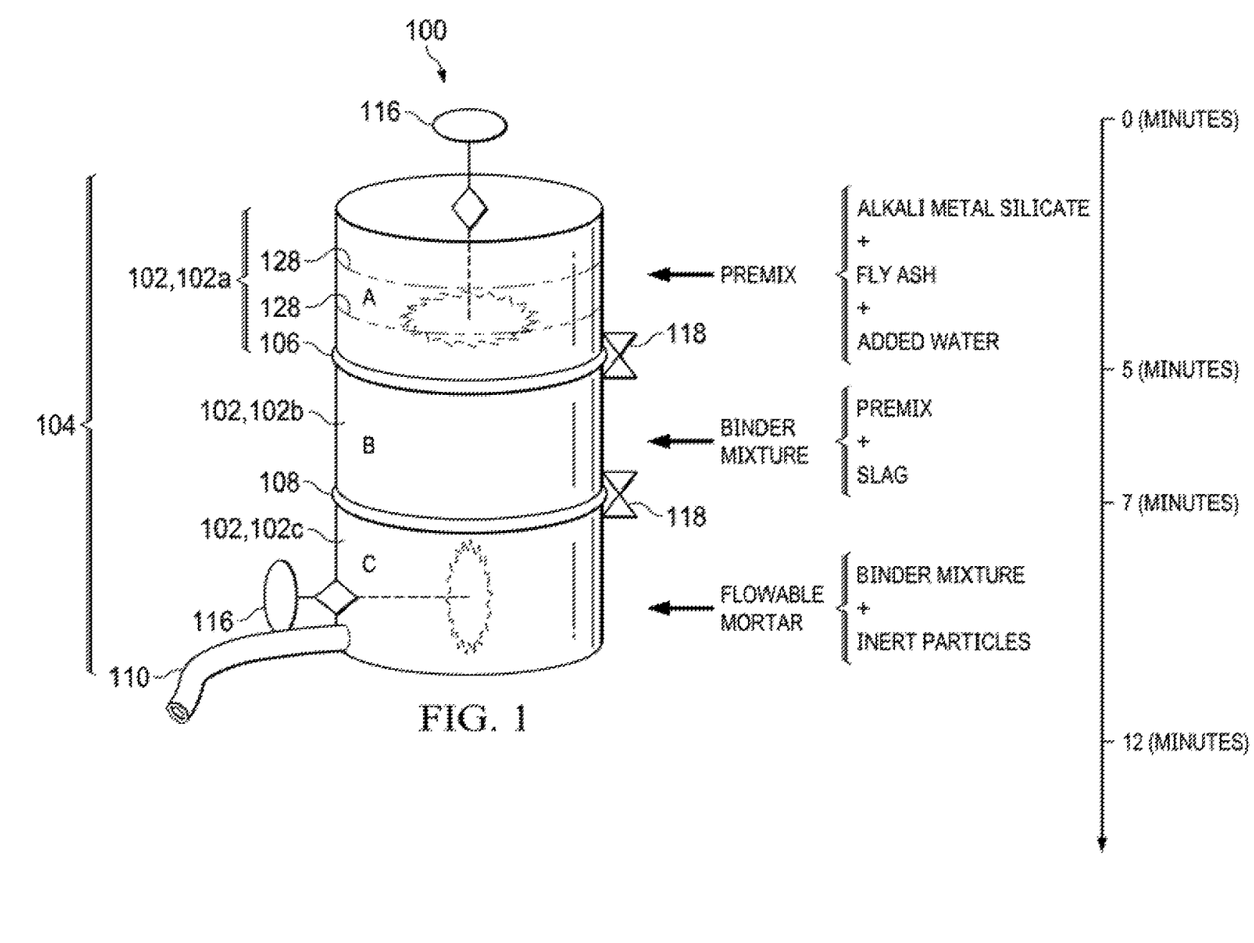
FIG. 1 is a schematic of a drum or vessel that may be used for mixing of a flowable binder.

The method of using the flowable binder for construction or repair may entail use of a drum or vessel 100 including an arrangement of compartments 102, such as a stack 104 of compartments 102 as shown in FIG. 1, in order to achieve controlled mixing.

Referring to FIG. 1, the mixing together of the alkali metal silicate, the added water, and the fly ash to form the premix may occur in a top compartment 102a of the stack separated from a middle compartment 102b by a first separator 106. The dotted lines shown in the top compartment 102a illustrate optional additional separators 128 that may divide the top compartment 102a into sub-compartments that may hold each component (e.g., the added water, alkali metal silicate, and fly ash) separately prior to sequential removal of the additional separators 128 from top to bottom to allow for mixing and formation of the premix.

After removal of the first separator 106 between the top compartment 102a and a middle compartment 102b below the top compartment 102a, the premix may flow into the middle compartment 102b. The premix and the slag may then be mixed together in the middle compartment 102b, thereby forming the binder mixture. After removal of a second separator 108 between the middle compartment 102b and a bottom compartment 102c below the middle compartment 102b, the binder mixture may flow into the bottom compartment 102c. The binder mixture and inert particles may then be mixed together in the bottom compartment 102c to form the flowable mortar.

The mixing together that occurs in each compartment and/or sub-compartment may entail use of a high-shear mixer or another agitation device that promotes mixing. For example, a high shear paddle mixer 116 may extend into each compartment/sub-compartment, as illustrated in FIG. 1 for the top and bottom compartments 102a,102c. Exemplary mixing times for each compartment are shown on the timeline in FIG. 1. The first and second separators 106,108 and/or the additional separators 128 may comprise valves that can be opened and/or dividers that can be extracted from between compartments/sub-compartments by, for example, turning external knobs 118.

The vessel 100 may have an outlet 110 from the bottom compartment 102c for distribution of the flowable mortar over a bed of coarse aggregate. Due to the rheology of the flowable mortar, it can seep into gaps or interstices of the coarse aggregate to form what may be described as a self-compacting concrete.

Figure 2:
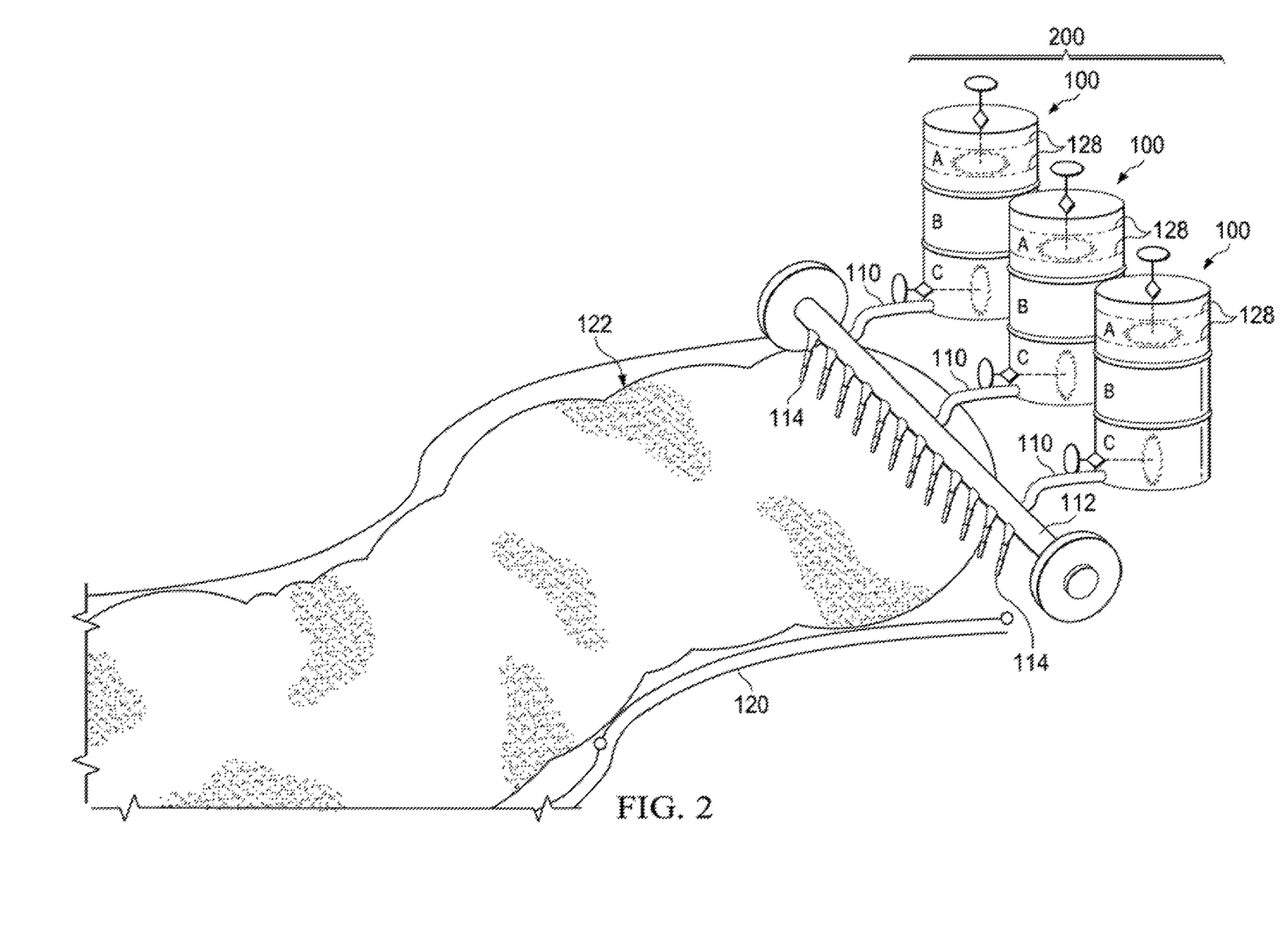
FIG. 2 is a schematic of an array of vessels that can be used for high-throughput mixing of the flowable binder and subsequent fabrication of a self-compacting concrete.

Referring to FIG. 2, an apparatus 200 including an array of the vessels 100 may enable high throughput distribution of the flowable mortar. For example, as shown in the schematic, the outlet 110 of each vessel 100 may feed into a distribution pipe 112 with an array of holes or discharge nozzles 114 to distribute the flowable mortar across a bed of coarse aggregate 122. The apparatus 200 may be mounted on wheels to facilitate movement over a formwork 120 holding the coarse aggregate 122.

Curing or setting of the binder mixture to full strength may be carried out over a suitable time period at room or ambient temperature (e.g., about 20-25° C.). Alternatively, the curing may be carried out at an elevated temperature, such as between about 40° C. and 60° C. Typically, curing at ambient temperature takes place over a period from at least several hours (preferably at least one day) to several weeks (e.g., up to 28 days).

As stated above, the cured binder exhibits excellent compressive and flexural strength. Mechanical properties data for a number of cured binders as a function of slag/fly ash ratio and curing conditions are discussed in the Examples below.

Selective chemical extractions and nuclear magnetic resonance (NMR) spectroscopy reveal that the cured binder may include C-N-A-S-H gel, unreacted slag, and unreacted fly ash, where C-N-A-S-H gel is the major binding phase formed. The term "C-N-A-S-H gel" refers to a calcium silicate hydrate gel in which aluminum substitutes for silicon and sodium substitutes for calcium in varying degrees.

Figure 3A:
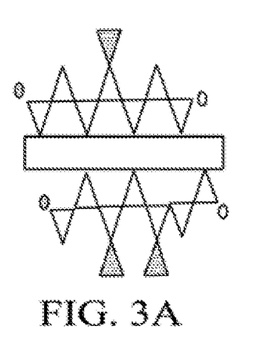
FIGS. 3A-3J show proposed structures of C-N-A-S-H gel for cured binders of different slag/fly ash ratios and curing conditions.
Figure 3B:
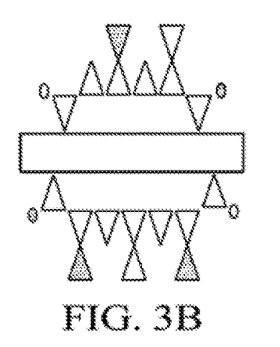
Figure 3C:
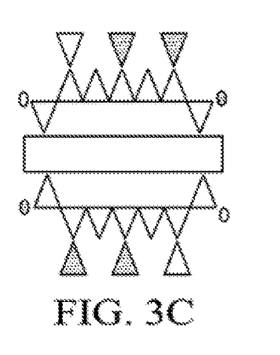
Figure 3D:
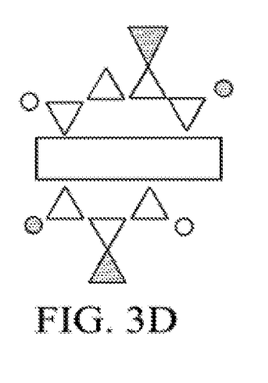
Figure 3E:
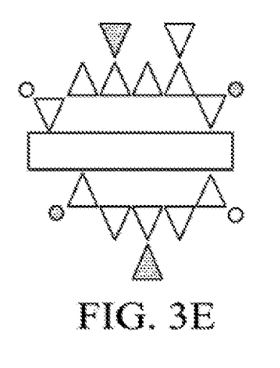
Figure 3F:
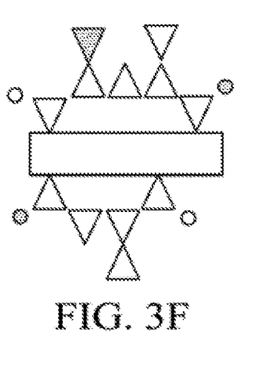
Figure 3G:
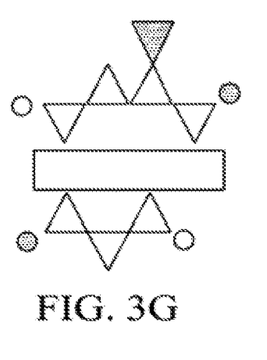
Figure 3H:
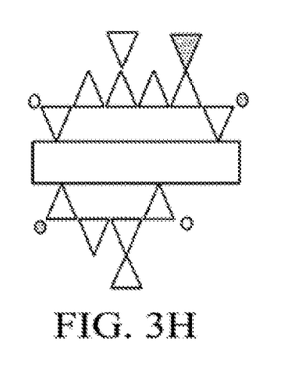
Figure 3I:
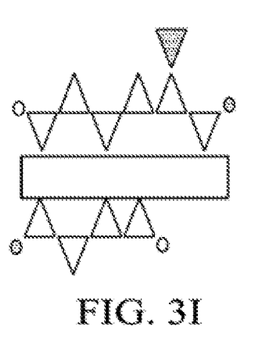
Figure 3J:
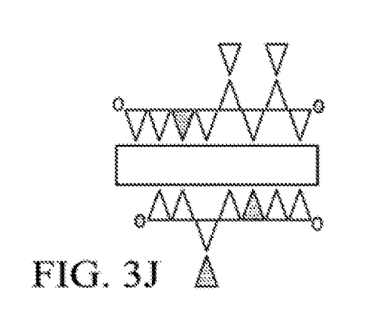

Proposed structures of C-N-A-S-H gel for cured binders of different slag/fly ash ratios and curing conditions are illustrated in FIGS. 3A-3J. Referring to Table 2 below in conjunction with the C-N-A-S-H gel schematics, where rectangles indicate poorly ordered CaO sheets, white triangles indicate $SiO_4$ tetrahedra, dark triangles indicate $AlO_4^-$ tetrahedra, and circles indicate different charge balancing cations: FIG. 3A shows the structure obtained from binder mixture 1; FIG. 3B shows the structure obtained from binder mixture 2; FIG. 3C shows the structure obtained from binder mixture 3; FIG. 3D shows the structure obtained from binder mixture 4; FIG. 3E shows the structure obtained from binder mixture 5; FIG. 3F shows the structure obtained from binder mixture 6; FIG. 3G shows the structure obtained from binder mixture 8; FIG. 3H shows the structure obtained from binder mixture 9; FIG. 3I shows the structure obtained from binder mixture 10; and FIG. 3J shows the structure obtained from binder mixture 7.

Table 2 below provides compositional data for cured binders formed from binder mixtures of various slag/fly ash ratios and curing conditions. The C-N-A-S-H gel may be present at a concentration from about 39 wt. % to about 64 wt. %, and in some cases the C-N-A-S-H gel is present at a concentration of at least about 42 wt. % (e.g., about 42-60 wt. %). The amount of C-N-A-S-H gel, which is found to be the predominant binding phase, is observed to increase in concentration with increasing slag/fly ash ratio. There may be some or no geopolymer (GP) present in the cured binder; when the geopolymer is present, it may have a concentration from >0 wt. % to about 12 wt. %, based on these examples. There may be some or no unreacted slag in the cured binder; when the unreacted slag is present, it may have a concentration from >0 wt. % to about 17 wt. %. The unreacted fly ash may be present at a concentration from about 19 wt. % to about 56 wt. %. When present, $0^\circ$, which represents orthosilicate units, may have a concentration from >0 wt. % to about 10 wt. %. Because of the improved mechanical properties obtained when higher slag-to-fly ash ratios are employed for the binder mixture, as discussed above, the slag/fly ash ratio is preferably in a range from about 0.3 to about 1.

TABLE 2

0Compositions of Cured Binders

| Binder Mixture | Slag/Fly Ash Ratio | Curing Temp. | Curing Time (day(s)) | C-N-A-S-H Gel (wt. %) | $Q^0$ | GP | Unreacted Slag (wt. %) | Unreacted Fly Ash (wt. %) |
|---|---|---|---|---|---|---|---|---|
| 1 | 0.18 | RT | 1 | 39 | 5 | 0 | 0 | 56 |
| 2 | 0.18 | RT | 14 | 48 | 4 | 0 | 0 | 49 |
| 3 | 0.18 | RT | 28 | 46 | 0 | 6 | 0 | 47 |
| 4 | 0.33 | RT | 1 | 42 | 10 | 0 | 9 | 39 |
| 5 | 0.33 | RT | 14 | 43 | 6 | 3 | 5 | 43 |
| 6 | 0.33 | RT | 28 | 48 | 4 | 12 | 7 | 30 |
| 7 | 0.33 | 50° C. | 1 | 54 | 8 | 0 | 0 | 38 |
| 8 | 1.00 | RT | 1 | 57 | 5 | 0 | 12 | 26 |
| 9 | 1.00 | RT | 14 | 60 | 4 | 0 | 17 | 19 |
| 10 | 1.00 | RT | 28 | 54 | 6 | 0 | 11 | 29 |

A composite (or concrete) suitable for construction or repair may be formed upon curing the flowable binder described herein. The composite may comprise: a cured binder including C-N-A-S-H gel at a concentration from about 39 wt. % to about 64 wt. %, unreacted slag (in some examples), and unreacted fly ash; and reinforcement material embedded in the cured binder. The reinforcement material may comprise inert particles and/or coarse aggregate. For example, the inert particles may comprise sand and the coarse aggregate may comprise gravel or rocks. Typically, the C-N-A-S-H gel is present at a concentration of at least about 42 wt. %, such as from about 42 wt. % to about 60 wt. %. The cured binder may further include a geopolymer. Typically, the geopolymer is present in an amount of about 20 wt. % or less, about 15 wt. % or less, or about 12 wt. % or less, as indicated in the examples of Table 2. The unreacted slag, when present, may have a concentration in the cured binder from >0 wt. % to about 17 wt. %, particularly if Grade 100 slag is used. The proportion of unreacted slag may depend on the chemical make-up (e.g., % amorphous, oxide composition, particle size and grade of slag used. The unreacted fly ash may be present at a concentration from about 19 wt. % to about 56 wt. %, where the proportion may depend on the chemical make-up of the fly ash.

EXAMPLES

Processing of Flowable Binders

Class F fly ash, Grade 100 ground granulated blast furnace slag (GGBFS), and liquid sodium silicate were the raw materials used to make the flowable binders. Class F fly ash (<10 wt. % of CaO) was used in this study instead of class C fly ash because the latter contains large amounts of free lime (CaO) that causes flash set. Binder mixtures made using only class F fly ash may need heat to cure in a reasonable timeframe. Hence, GGBFS was selected to obtain ambient set within a few hours. Sourcing of raw materials was done according to the criteria of: feasibility for scale up, availability, and cost. Sodium silicate solution (PQ Corporation, Valley Forge, Pa.) having a molar $SiO_2$:$Na_2O$ ratio of 1.65:1 (modulus) was chosen for this study. Class F fly ash from Boral Corp. (Roswell, Ga.) and Grade 100 GGBFS from LaFarge Corp. (Chicago, Ill.) were the aluminosilicate sources used in this study. Their oxide compositions, determined through XRF (Shimadzu EDX-7000P, Columbia, Md.) are listed below in Table 3.

TABLE 3

Oxide Compositions of Fly Ash and Slag

| Analyte oxide | Class F fly ash | | GGBFS | |
|---|---|---|---|---|
| | Result wt (%) | SD wt (%) | Result wt (%) | SD wt (%) |
| $Al_2O_3$ | 25.32 | 0.1 | 9.47 | 0.1 |
| $Na_2O$ | 0.46 | 0.4 | 0.00 | 0.0 |
| MgO | 1.07 | 0.1 | 11.47 | 0.2 |
| $SiO_2$ | 63.26 | 0.2 | 42.55 | 0.1 |
| $SO_3$ | 0.80 | 0.0 | 2.35 | 0.0 |
| $K_2O$ | 2.13 | 0.0 | 0.42 | 0.0 |
| CaO | 1.00 | 0.0 | 32.92 | 0.1 |
| $TiO_2$ | 0.82 | 0.0 | 0.35 | 0.0 |
| MnO | 0.06 | 0.0 | 0.17 | 0.0 |
| $Fe_2O_3$ | 5.04 | 0.0 | 0.27 | 0.0 |
| SrO | 0.02 | 0.0 | 0.04 | 0.0 |

Sodium silicate solution was added to the class F fly ash and mixed using a high shear mixer (IKA Model RW20DZM, Wilmington, N.C.) for 5 minutes at 71.552 g. Then, GGBFS was added and further mixed for 2 minutes at 1600 rpm. Deionized water was added to this mixture which was further mixed in the high shear mixer for 5 minutes in a steel beaker. The binder mixture designs used in this study are listed in Table 1 above.

Subsequently, the binder mixture was cured in a sealed Delrin® (polyoxymethylene) mold (Versatech, LLC, Decatur, Ill.) coated with a thin layer of petroleum jelly as a mold release agent. The mold was wrapped with a plastic food service film and a wet towel to prevent water loss while curing. Curing was carried out at 22° C. for various time periods, or at 50° C. for 72 hours in a Lab Companion oven (Jeio Tech, Seoul, Korea). Ambient-cured samples were stored in sealed plastic bags until tested at 3, 7, 14, and 28 days. Flexural test specimens measured 10 mm×10 mm×50 mm. Compressive test specimens were cylinders measuring 25 mm in diameter and 50 mm in height.

Based on preliminary workability studies, the combined amount of slag and fly ash was held constant at 65 wt. % of the binder mixture. Increases in the amount of solid material reduced workability for this binder mixture. The slag/fly ash ratio was varied from 0 to 1. The amount of sodium silicate solution was held constant at 25 wt. %. The added water was fixed at 10 wt. % so that the total water (including water in the sodium silicate solution) to solids mass ratio (including solids in sodium silicate solution) was 0.26 for all binder mixtures. The $H_2O/Na_2O$ molar ratio was 20.4, or about 20.

Characterization of Cured Binders

The cured binders were crushed to fine powders using a mortar and pestle. Selective chemical extractions and nuclear magnetic resonance (NMR) experiments were performed on powdered binders and dried extraction residues, also in powdered form. Salicylic acid-methanol (SAM) extraction removes calcium silicate hydrate, calcium aluminum silicate hydrate, but does not dissolve unreacted slag, unreacted fly ash, or geopolymer. Hydrochloric acid (HCl) extraction removes geopolymer and slag.

$^{29}$Si MAS-NMR spectra of the cured binder, SAM residue, and hydrochloric acid (HCl) residue were obtained and analyzed. By subtracting the SAM residue spectrum from the binder spectrum, the C-N-A-S-H gel spectrum was obtained. The mean chain length (MCL), Al/Si ratio, and Ca/(Si+Al) ratio of the C-N-A-S-H gel were calculated and are compiled in Table 4 below as a function of slag/fly ash ratio of the binder mixture and the curing conditions. As can be observed, the MCL exhibited a decrease with slag/fly ash ratio. As the slag/fly ash ratio increased, the Ca/(Si+Al) ratio increased, and thus the MCL decreased. On the other hand, the MCL increased with curing temperature. In summary, the MCL of the C-N-A-S-H gel exhibited a negative correlation with slag/fly ash ratio and Ca/(Si+Al) ratio, but a positive correlation with curing temperature.

TABLE 4

Characterization of C-N-A-S-H Gel

| Slag/Fly Ash Ratio - Binder Mixture | Curing Temp. | Curing Time (day(s)) | Mean Chain Length (MCL) | Al/Si ratio | Ca/(Si + Al) |
|---|---|---|---|---|---|
| 0.18 | RT | 1 | 7.1 | 0.20 | 0.84 |
| 0.18 | RT | 14 | 6.7 | 0.25 | 0.90 |
| 0.18 | RT | 28 | 7.4 | 0.23 | 0.85 |
| 0.33 | RT | 1 | 3.7 | 0.26 | 0.94 |
| 0.33 | RT | 14 | 5.1 | 0.22 | 0.89 |
| 0.33 | RT | 28 | 4.3 | 0.13 | 0.91 |
| 0.33 | 50° C. | 1 | 8.0 | 0.18 | 0.83 |
| 1.00 | RT | 1 | 3.5 | 0.16 | 0.95 |
| 1.00 | RT | 14 | 5.0 | 0.08 | 0.90 |
| 1.00 | RT | 28 | 4.4 | 0.08 | 0.89 |

Mechanical Properties of Cured Binders

Figure 4:
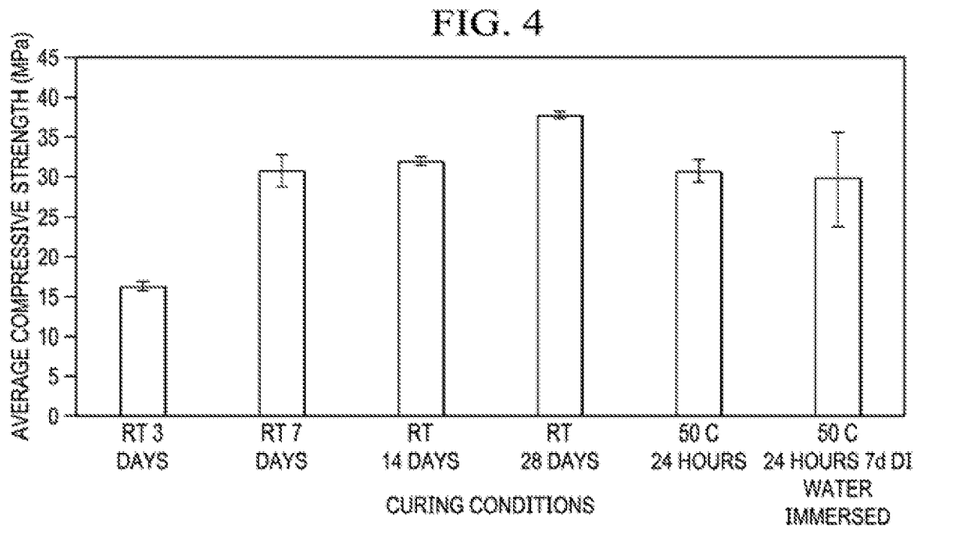
FIG. 4 shows average compressive strength of the cured binder as a function of curing conditions.
Figure 5:
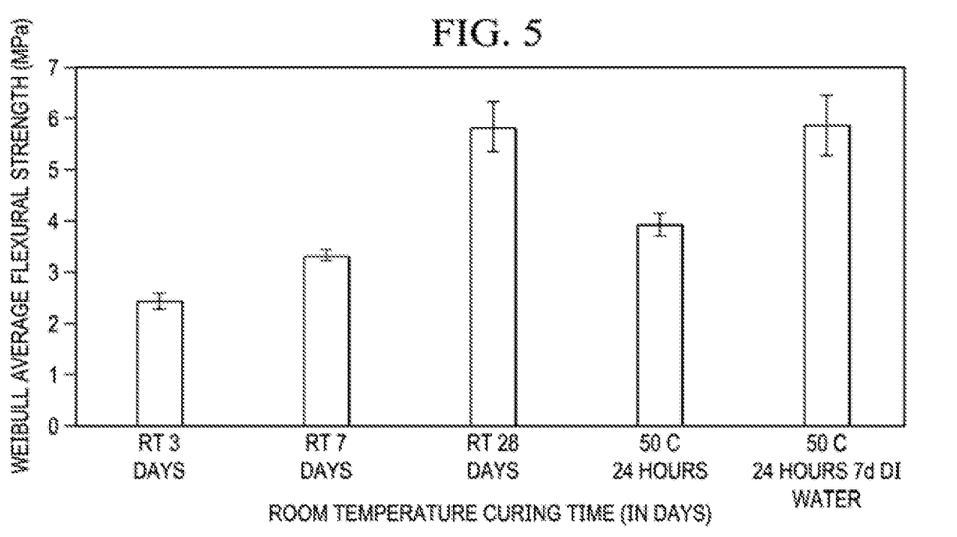
FIG. 5 shows average flexural strength of the cured binder as a function of curing conditions.

Twelve binder specimens for each curing condition were tested in four-point flexural strength tests (third-point loading) according to ASTM C78/C78M-10 standard practice. Flexural test specimen dimensions were 10 mm×10 mm×50 mm. The load cell had a full-scale capacity of 2 kN. Eight binder cylinders, of 25 mm diameter and 50 mm height, for each different curing condition were tested in compression according to ASTM 1424-10. Weibull statistics were obtained for the samples tested in compression and flexure. Compressive and flexural strength data are shown in Tables 5 and 6, respectively, and average compressive and flexural strengths as a function of curing conditions are plotted in FIGS. 4 and 5, respectively.

The compressive and flexural strengths of the binder cylinders exhibited significant strength development over time for all slag-fly ash binder mixtures. Mix 1.0, which was cured at room temperature for 28 days, was the strongest with a compressive strength of 60±8 MPa and a flexural strength 5.7±1.5 MPa (160% and 80% increases, respectively, from the compressive and flexural strengths at 3 days). Mix 0 was the weakest mixture which took 14 days to cure at room temperature. However, when the temperature was increased to 50° C., Mix 0 hardened within 24 hours. As the amount of slag increased, the setting time decreased and strength development was more rapid. The compressive and flexural strengths at the end of 28 days increased as the amount of slag content increased in the binder mixture. As the amount of slag increased, the amount of amorphous product between the fly ash cenospheres increased, helping to improve the compressive and flexural strengths.

The added water (externally added DI water) was varied by ±50 wt % in Mix 0.33 and resulted in a 50% H₂O Mix 0.33 and 150% H₂O Mix 0.33, respectively. In general, in binder mixtures that undergo ambient curing, there was an optimum water content. Water content below the optimum level resulted in an incomplete reaction and water content above the optimum level led to an increase in porosity of the resulting binder mixtures. In both cases, there is a reduction in strength. Water content may impact the extent of reaction, porosity, workability, and strength of the binder mixture. There was an increase in compressive strength as the added water amount was halved (the water content in sodium silicate remained constant), but there was a decrease in the workability of the binder. When the added water amount was increased by 50%, there was a decrease in compressive strength and an increase in workability was observed. An increase in the average pore size of the cured binder contributed to a loss of compressive strength.

TABLE 5

Compressive Strength of Cured Binders

| Mix ID (curing conditions) | $\beta$ (modulus) | $\sigma_0$ (scale parameter) (MPa) | $\sigma_r$ (Weibull average) (MPa) | SD (MPa) | 95% Confidence interval |
|---|---|---|---|---|---|
| 0 (RT 3 d) | No cure | | | | |
| 0 (RT 7 d) | No cure | | | | |
| 0 (RT 14 d) | 2 | 3 | 3 | 1.3 | (2.2, 3.4) |
| 0 (RT 28 d) | 2 | 7 | 7 | 3.1 | (5.1, 8.3) |
| 0 (50° C. 3 d) | 3 | 5 | 4 | 1.4 | (3.3, 5.0) |
| 0.18 (RT 3 d) | 4 | 10 | 9 | 2.6 | (8.1, 10.0) |
| 0.18 (RT 7 d) | 3 | 16 | 15 | 4.7 | (12.5, 17.5) |
| 0.18 (RT 14 d) | 4 | 21 | 19 | 4.8 | (16.7, 22.0) |
| 0.18 (RT 28 d) | 4 | 31 | 28 | 7.3 | (24.3, 32.2) |
| 0.18 (50 v 3 d) | 7 | 16 | 15 | 2.4 | (13.4, 16.1) |
| 0.25 (RT 3 d) | 6 | 9 | 9 | 1.8 | (7.7, 9.8) |
| 0.25 (RT 7 d) | 3 | 16 | 15 | 5.1 | (12.3, 17.5) |
| 0.25 (RT 14 d) | 4 | 28 | 25 | 7.6 | (21.6, 30.0) |
| 0.25 (RT 28 d) | 6 | 26 | 24 | 4.7 | (21.9, 27.4) |
| 0.25 (50° C. 3 d) | 4 | 22 | 20 | 6.2 | (16.9, 22.6) |
| 0.33 (RT 3 d) | 6 | 14 | 13 | 2.6 | (11.6, 14.7) |
| 0.33 (RT 7 d) | 3 | 26 | 24 | 8.7 | (19.1, 28.8) |
| 0.33 (RT 14 d) | 3 | 27 | 24 | 8.1 | (19.8, 29.7) |
| 0.33 (RT 28 d) | 2 | 31 | 28 | 13.9 | (19.9, 38.0) |
| 0.33 (50° C. 3 d) | 5 | 28 | 25 | 5.4 | (21.9, 29.4) |
| 1.0 (RT 3 d) | 5 | 36 | 33 | 7.9 | (28.6, 38.3) |
| 1.0 (RT 7 d) | 4 | 52 | 47 | 14.4 | (37.5, 57.5) |
| 1.0 (RT 14 d) | 6 | 47 | 44 | 8 | (39.0, 49.1) |
| 1.0 (RT 28 d) | 9 | 63 | 60 | 8.1 | (55.8, 65.1) |
| 1.0 (50° C. 3 d) | 6 | 51 | 47 | 9.8 | (41.1, 53.4) |
| 150% H₂O 0.33 (RT 3 d) | 6 | 14 | 13 | 2.4 | (11.9, 15.4) |
| 150% H₂O 0.33 (RT 7 d) | 2 | 12 | 11 | 6.8 | (7.1, 14.4) |
| 150% H₂O 0.33 (RT 14 d) | 4 | 16 | 15 | 4 | (12.5, 17.1) |
| 150% H₂O 0.33 (RT 28 d) | 4 | 21 | 19 | 5.5 | (16.4, 23.0) |
| 150% H₂O 0.33 (50° C. 3 d) | 6 | 23 | 21 | 3.9 | (19.4, 23.4) |
| 50% H₂O 0.33 (RT 3 d) | 6 | 17 | 16 | 2.9 | (13.9, 17.9) |
| 50% H₂O 0.33 (RT 7 d) | 5 | 23 | 21 | 5.3 | (17.3, 24.8) |
| 50% H₂O 0.33 (RT 14 d) | 3 | 31 | 28 | 9.7 | (23.2, 33.2) |
| 50% H₂O 0.33 (RT 28 d) | 9 | 44 | 42 | 5.5 | (38.4, 45.4) |
| 50% H₂O 0.33 (50° C. 3 d) | 4 | 30 | 28 | 7.4 | (19.9, 38.0) |

TABLE 6

Flexural Strength of Cured Binders

| Mix ID (curing conditions) | $\beta$ (modulus) | $\sigma_0$ (scale parameter) (MPa) | $\sigma_r$ (Weibull average) (MPa) | SD (MPa) | 95% Confidence interval |
|---|---|---|---|---|---|
| 0 (RT 3 d) | No cure | | | | |
| 0 (RT 7 d) | | | | | |
| 0 (RT 14 d) | 4.4 | 1.3 | 1.1 | 0.3 | (1.04, 1.25) |
| 0 (RT 28 d) | 6.8 | 2.2 | 2.1 | 0.4 | (1.86, 2.28) |
| 0.18 (RT 3 d) | 2.6 | 2.0 | 1.8 | 0.7 | (1.43, 2.11) |
| 0.18 (RT 7 d) | 4.0 | 2.5 | 2.3 | 0.6 | (1.97, 2.67) |
| 0.18 (RT 14 d) | 3.9 | 3.3 | 3.0 | 0.9 | (2.56, 3.48) |
| 0.18 (RT 28 d) | 4.1 | 3.2 | 2.9 | 0.8 | (2.47, 3.44) |
| 0.25 (RT 3 d) | 4.8 | 2.3 | 2.1 | 0.5 | (1.86, 2.44) |
| 0.25 (RT 7 d) | 4.0 | 2.6 | 2.4 | 0.7 | (2.03, 2.73) |
| 0.25 (RT 14 d) | 6.3 | 3.5 | 3.3 | 0.6 | (2.93, 3.63) |
| 0.25 (RT 28 d) | 5.7 | 3.8 | 3.6 | 0.7 | (3.15, 4.00) |
| 0.33 (RT 3 d) | 2.8 | 1.6 | 1.5 | 0.6 | (1.18, 1.79) |
| 0.33 (RT 7 d) | 3.1 | 2.6 | 2.3 | 0.8 | (1.99, 2.70) |
| 0.33 (RT 14 d) | 4.2 | 4.7 | 4.3 | 1.1 | (3.81, 4.78) |
| 0.33 (RT 28 d) | 3.7 | 5.4 | 4.8 | 1.5 | (4.09, 5.71) |

TABLE 6-continued

Flexural Strength of Cured Binders

| Mix ID (curing conditions) | β (modulus) | $\sigma_0$ (scale parameter) (MPa) | $\sigma_r$ (Weibull average) (MPa) | SD (MPa) | 95% Confidence interval |
|---|---|---|---|---|---|
| 1.0 (RT 3 d) | 1.6 | 2.4 | 2.2 | 1.4 | (1.37, 3.22) |
| 1.0 (RT 7 d) | 3.8 | 1.7 | 1.6 | 0.5 | (1.31, 1.83) |
| 1.0 (RT 14 d) | 5.2 | 2.5 | 2.3 | 0.5 | (2.06, 2.61) |
| 1.0 (RT 28 d) | 4.4 | 6.2 | 5.7 | 1.5 | (5.06, 6.39) |

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of using a flowable mortar for construction or repair, the method comprising:
   providing a vessel including an arrangement of compartments comprising: a top compartment; a middle compartment below the top compartment; a first separator between the top compartment and the middle compartment; a bottom compartment below the middle compartment, the bottom compartment including an outlet; and a second separator between the middle compartment and the bottom compartment;
   providing a binder mixture comprising an alkali metal silicate, fly ash, slag, and added water, a total water-to-solids mass ratio of the binder mixture being in a range from about 0.2 to 0.5, wherein the providing comprises:
   mixing together, in the top compartment, the alkali metal silicate and the fly ash to form a premix;
   after forming the premix, removing the first separator, the premix flowing from the top compartment into the middle compartment; and
   mixing together the premix and slag in the middle compartment to form the binder mixture;
   after forming the binder mixture, removing the second separator, the binder mixture flowing into the bottom compartment;
   mixing together the binder mixture and inert particles in the bottom compartment to form a flowable mortar that passes through the outlet;
   distributing the flowable mortar over a bed of coarse aggregate, the flowable mortar seeping into interstices of the coarse aggregate; and
   curing the flowable mortar;
   wherein, upon curing, a composite comprising reinforcement material embedded in a cured binder is formed, the reinforcement material comprising the inert particles and the coarse aggregate.

2. The method of claim 1, wherein the fly ash is present in the binder mixture at a concentration from about 30 wt. % to about 60 wt. %, and wherein the slag is present at a concentration from about 9 wt. % to about 33 wt. %.

3. The method of claim 1, further comprising mixing the added water in the top compartment to form the premix, wherein the top compartment includes three sub-compartments separated by removable separators for containing the added water, the alkali metal silicate, and the fly ash prior to mixing together to form the premix.

4. The method of claim 1, wherein the curing is carried out at ambient temperature.

5. The method of claim 1, wherein the cured binder comprises:
   C-N-A-S-H gel; and
   unreacted fly ash.

6. The method of claim 5, wherein the cured binder further comprises unreacted slag.

* * * * *